(12) United States Patent
Zhu et al.

(10) Patent No.: US 11,275,898 B2
(45) Date of Patent: Mar. 15, 2022

(54) SEARCH METHOD AND DEVICE BASED ON ARTIFICIAL INTELLIGENCE (71) Applicant: BEIJING BAIDU NETCOM SCIENCE AND TECHNOLOGY CO., LTD., Beijing (CN)

(72) Inventors: Yong Zhu, Beijing (CN); Xunchao Song, Beijing (CN); Ying Li, Beijing (CN); Yilin Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 221 days.

(21) Appl. No.: 16/157,204

(22) Filed: Oct. 11, 2018

(65) Prior Publication Data
US 2019/0205384 A1 Jul. 4, 2019

(30) Foreign Application Priority Data
Dec. 28, 2017 (CN) .......................... 201711464202.1

(51) Int. Cl.
*G06F 17/27* (2006.01)
*G06F 17/30* (2006.01)
(Continued)

(52) U.S. Cl.
CPC .......... *G06F 40/30* (2020.01); *G06F 16/3344* (2019.01); *G06F 16/35* (2019.01)

(58) Field of Classification Search
CPC ....... G06F 40/30; G06F 16/35; G06F 16/3344
(Continued)

(56) References Cited

U.S. PATENT DOCUMENTS 8,630,860 B1 * 1/2014 Zhang ..................... G10L 15/26
704/275
9,009,144 B1 * 4/2015 Li ........................... G06F 16/242
707/722
(Continued)

FOREIGN PATENT DOCUMENTS

CN 102012900 A 4/2011
CN 102419778 A 4/2012
(Continued)

OTHER PUBLICATIONS

Chinese Patent Application No. 201711464202.1 First Office Action dated Mar. 15, 2021, 10 pages.
(Continued)

*Primary Examiner* — Usmaan Saeed
*Assistant Examiner* — Earl Elias
(74) *Attorney, Agent, or Firm* — Lathrop GPM LLP (57) ABSTRACT

The present disclosure provides a search method and device based on artificial intelligence and an electronic device. The search method based on artificial intelligence includes: obtaining a query; performing a word segmentation on the query to obtain a term sequence containing a plurality of terms; performing a structured analysis on the term sequence to generate a semantic pattern; performing a knowledge-based analysis on the term sequence based on the semantic pattern to generate a semantic analysis result; determining an understanding result corresponding to the query based on the semantic pattern and the semantic analysis result; and performing a search based on the understanding result corresponding to the query.

16 Claims, 7 Drawing Sheets

(51) Int. Cl.
  *G06F 40/30* (2020.01)
  *G06F 16/35* (2019.01)
  *G06F 16/33* (2019.01)
(58) Field of Classification Search
  USPC .......................................................... 707/722
  See application file for complete search history.

(56) References Cited

U.S. PATENT DOCUMENTS

| | | | | |
|---|---|---|---|---|
| 2007/0271255 | A1* | 11/2007 | Pappo | G06F 16/951 |
| 2011/0060733 | A1* | 3/2011 | Peng | G06F 16/9535 |
| | | | | 707/723 |
| 2016/0140232 | A1* | 5/2016 | Smirnov | G06F 16/3338 |
| | | | | 707/768 |
| 2017/0169111 | A1* | 6/2017 | Baum | G06F 16/217 |
| 2017/0193020 | A1* | 7/2017 | Yi | G06F 16/2455 |
| 2019/0005124 | A1* | 1/2019 | Tripathi | G06F 40/30 |

FOREIGN PATENT DOCUMENTS

| | | |
|---|---|---|
| CN | 102955857 A | 3/2013 |
| CN | 103699663 A | 4/2014 |

OTHER PUBLICATIONS

Chinese Patent Application No. 201711464202.1 English translation of First Office Action dated Mar. 15, 2021, 9 pages.

\* cited by examiner

SEARCH METHOD AND DEVICE BASED ON ARTIFICIAL INTELLIGENCE

CROSS-REFERENCE TO RELATED APPLICATION

This application claims priority to Chinese Patent Application No. Chinese Patent Application No. 201711464202.1, filed on Dec. 28, 2017, the entire content of which is incorporated herein by reference.

FIELD

The present disclosure relates to a field of information processing technology, and more particularly to a search method and a search device based on artificial intelligence.

BACKGROUND

Traditional search engines mainly divide a query into multiple keywords for analysis during query (or query information) understanding. In detail, the query may be segmented first, to generate a set containing multiple keywords, and each keyword is assigned to a certain weight. Then content to be retrieved, such as Internet webpages, may be further segmented to generate a set containing terms, and each term is assigned to a certain weight. A degree of word coincidence, i.e. a similarity, between the set containing multiple keywords and the set containing terms is calculated, and a score is calculated according to the weights, then a sorting result of pure text relevance is obtained. Finally, the sorting result is dynamically adjusted based on a user's record of continuous click behavior on the original sorting result, thus a search result that the user is more willing to click or stay is obtained.

SUMMARY

Embodiments of a first aspect of the present disclosure provide a search method based on artificial intelligence, including: obtaining a query; performing a word segmentation on the query to obtain a term sequence containing a plurality of terms; performing a structured analysis on the term sequence to generate a semantic pattern; performing a knowledge-based analysis on the term sequence based on the semantic pattern to generate a semantic analysis result; determining an understanding result corresponding to the query based on the semantic pattern and the semantic analysis result; and performing a search based on the understanding result corresponding to the query.

Embodiment of a second aspect of the present disclosure provide a search device based on artificial intelligence includes: an obtaining module, configured to obtain a query; a segmentation module, configured to perform a word segmentation on the query to obtain a term sequence containing a plurality of terms; a structured analysis module, configured to perform a structured analysis on the term sequence to generate a semantic pattern; a knowledge-based analysis module, configured to perform a knowledge-based analysis on the term sequence based on the semantic pattern to generate a semantic analysis result; a determining module, configured to determine an understanding result corresponding to the query based on the semantic pattern and the semantic analysis result; and a searching module, configured to perform a search based on the understanding result corresponding to the query.

Embodiments of a third aspect of the present disclosure provide a non-transitory computer-readable storage medium, having computer programs stored thereon, when the computer programs are executed by a processor, the processor is caused to execute a search method based on artificial intelligence according to the first aspect of embodiments of the present disclosure.

Embodiments of a fourth aspect of the present disclosure provide an electronic device, including a processor, a memory, and computer programs stored and executable on the memory. The processor is configured to perform a search method based on artificial intelligence according to the first aspect of embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The search method and the search device based on artificial intelligence, and the electronic device according to embodiments of the present disclosure will be descripted with reference to drawings.

General query understanding is a technique for refining demands corresponding to a query entered by a user based on natural language understanding. It is a necessary precondition for a search engine to perform information or knowledge retrieval. Traditional search engines mainly divide a query into multiple keywords for analysis during query (or query information) understanding. In detail, the query may be segmented first, to generate a set containing multiple keywords, and each keyword is assigned to a certain weight. Then content to be retrieved, such as Internet webpages, may be further segmented to generate a set containing terms, and each term is assigned to a certain weight. A degree of word coincidence, i.e. a similarity, between the set containing multiple keywords and the set containing terms is calculated, and a score is calculated according to the weights, then a sorting result of pure text relevance is obtained. Finally, the sorting result is dynamically adjusted based on a user's record of continuous click behavior on the original sorting result, thus a search result that the user is more willing to click or stay is obtained. However, in the above method, the query is not understood deeply, and the accuracy is not high due to recalling the sorting result relying on the flattened word set containing multiple keywords and optimizing the sorting result relying on the user's history behavior, thus the user's demands cannot be satisfied. By matching the terms only, the traditional search engine may not have a recalling ability, such as equivalent words and synonyms replacement of the keyword. If each term is regarded as a simplest undifferentiated word slot, and if the term sequence is regarded as a simplest semantic pattern (semantic structure), a corresponding parsing result may not have a generalization ability, thus it is hard to achieve structural generalization since there is no fully-worked description system.

After years of development and user habits iteration, search engines have evolved from initial keyword search to natural language search. At the same time, multi-mode input technology (such as speech input, character recognition in a captured photo, etc.) of mobile terminals puts higher requirements on the natural language search.

Accordingly, embodiments of the present disclosure provide a search method based on artificial intelligence, to realize structural understanding of user's demands, including limitation, semantics, intention and many other factors, under the natural language type query (also compatible with the keyword type query), to provide support for optimizing search result relevance, satisfaction of result knowledge information, and artificial intelligence application (such as question and answer technology) in a search scene, thus improving accuracy, and satisfying user demands.

Figure 1:
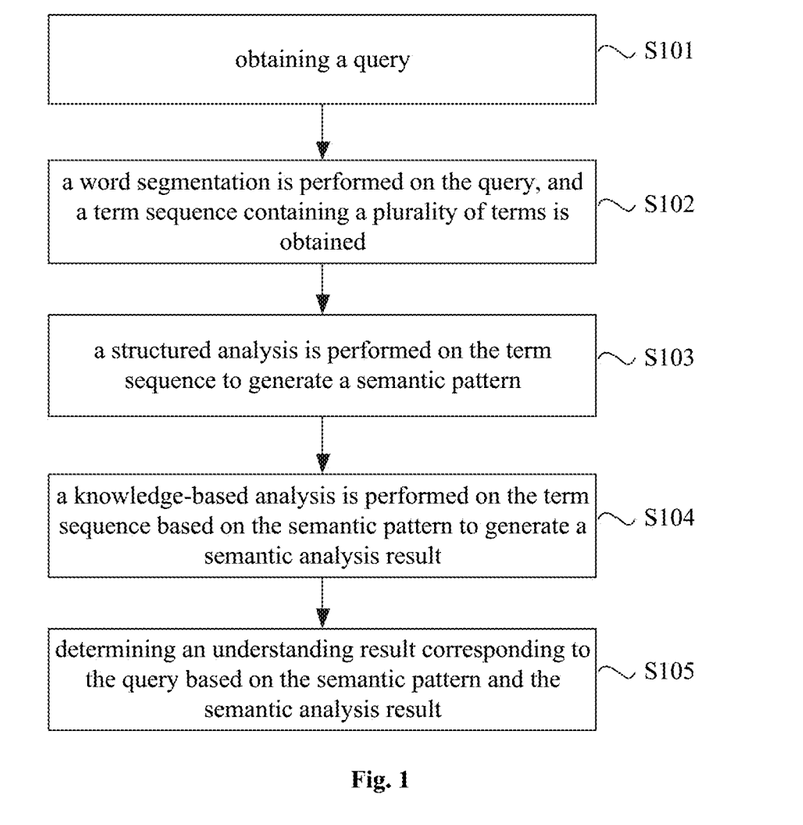
FIG. 1 is a flow chart of a search method based on artificial intelligence according to an embodiment of the present disclosure.

FIG. 1 is a flow chart of a search method based on artificial intelligence according to an embodiment of the present disclosure.

As illustrated in FIG. 1, the search method based on artificial intelligence includes the following.

At block S101, a query is obtained.

In an embodiment of the present disclosure, the query input by a user may be obtained.

At block S102, a word segmentation is performed on the query, and a term sequence containing a plurality of terms is obtained.

After the query is obtained, the word segmentation may be performed on the query to obtain the term sequence containing the plurality of terms.

At block S103, a structured analysis is performed on the term sequence to generate a semantic pattern.

Figure 3:
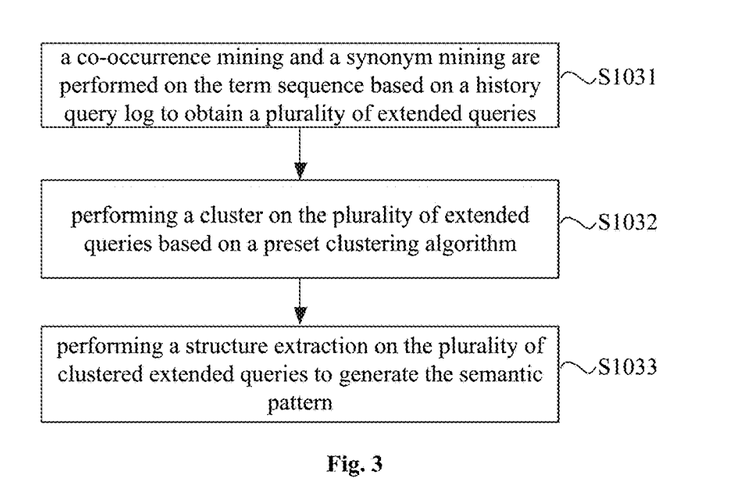
FIG. 3 is a flow chart of generating a semantic pattern according to an embodiment of the present disclosure.

In an embodiment of the present disclosure, as illustrated in FIG. 3, performing the structured analysis on the term sequence to generate the semantic pattern may include the following.

At block S1031, a co-occurrence mining and a synonym mining are performed on the term sequence based on a history query log to obtain a plurality of extended queries.

At block S1032, a cluster is performed on the plurality of extended queries based on a preset clustering algorithm.

At block S1033, a structure extraction is performed on the plurality of clustered extended queries to generate the semantic pattern.

In detail, firstly, a common term sequence and a differential term sequence among the plurality of clustered extended queries may be obtained based on a frequency of overlap among the plurality of clustered extended queries and long tail feature of dislocation among the plurality of clustered extended queries. Secondly, the differential term sequence among the plurality of clustered extended queries is replaced based on a slot of a preset type. Then the semantic pattern is generated based on the common term sequence and the slot of the preset type.

Figure 4:
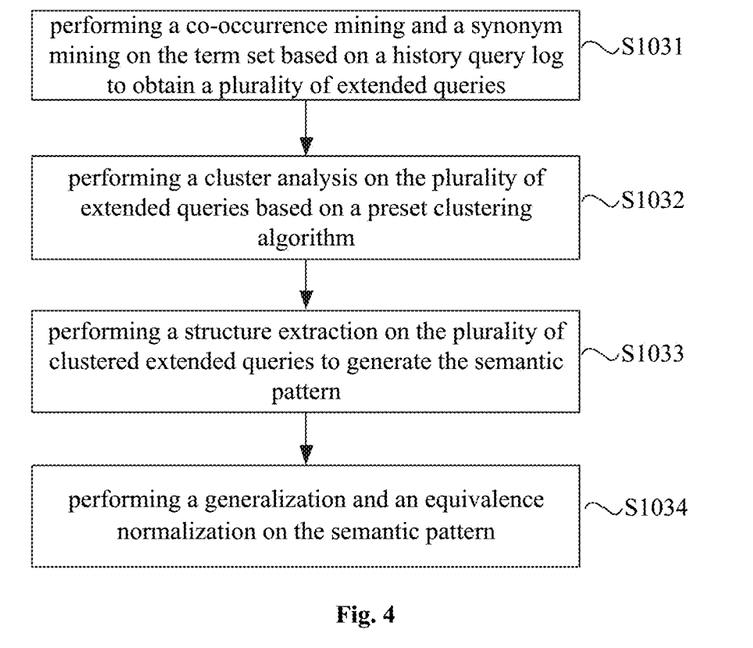
FIG. 4 is a flow chart of generating a semantic pattern according to another embodiment of the present disclosure.

In another embodiment of the present disclosure, as illustrated in FIG. 4, the method further includes the following.

At block S1034, a generalization and an equivalence normalization are performed on the semantic pattern.

In an embodiment of the present disclosure, firstly, a plurality of semantic element sets is filled in both the semantic pattern and a candidate semantic pattern to generate a first query corresponding to the semantic pattern and a second query corresponding to the candidate semantic pattern. Then a search is performed based on the first query to obtain a first search result, a search is performed based on the second query to obtain a second search result. After this, a co-occurrence score of click in the first search result and the second result is calculated. In response to the co-occurrence score being greater than a preset score, it is determined that the candidate semantic pattern is equivalent to the semantic pattern.

At block S104, a knowledge-based analysis is performed on the term sequence based on the semantic pattern to generate a semantic analysis result.

Figure 5:
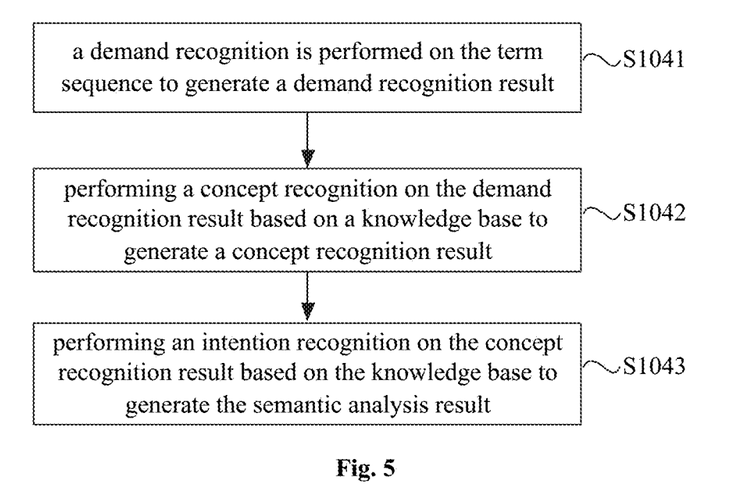
FIG. 5 is a flow chart of generating a semantic analysis result according to an embodiment of the present disclosure.

In an embodiment of the present disclosure, as illustrated in FIG. 5, performing the knowledge-based analysis on the term sequence based on the semantic pattern to generate the semantic analysis result includes may include the following.

At block S1041, a demand recognition is performed on the term sequence to generate a demand recognition result.

In detail, firstly, a query feature corresponding to the term sequence may be extracted. Then a search result feature corresponding to the query is obtained, and the demand recognition result is generated based on the query feature and the search result feature.

The search result feature includes at least one of a title feature, an abstract feature, a location feature, and a pattern feature.

After the demand recognition result is generated based on the query feature and the search result feature, a demand disambiguation may be performed on the demand recognition result.

In detail, a semantic segment of a search result corresponding to the query may be obtained, and an entity label in the semantic segment is obtained using a preset model. Then the demand disambiguation is performed on the demand recognition result based on the entity label.

At block S1042, a concept recognition is performed on the demand recognition result based on a knowledge base to generate a concept recognition result.

At block S1043, an intention recognition is performed on the concept recognition result based on the knowledge base to generate the semantic analysis result.

The demand recognition is to recognize an object, the concept recognition is to recognize what to do, and the intention recognition is to recognize what the object wants to do.

At block S105, an understanding result corresponding to the query is determined based on the semantic pattern and the semantic analysis result.

Figure 2:
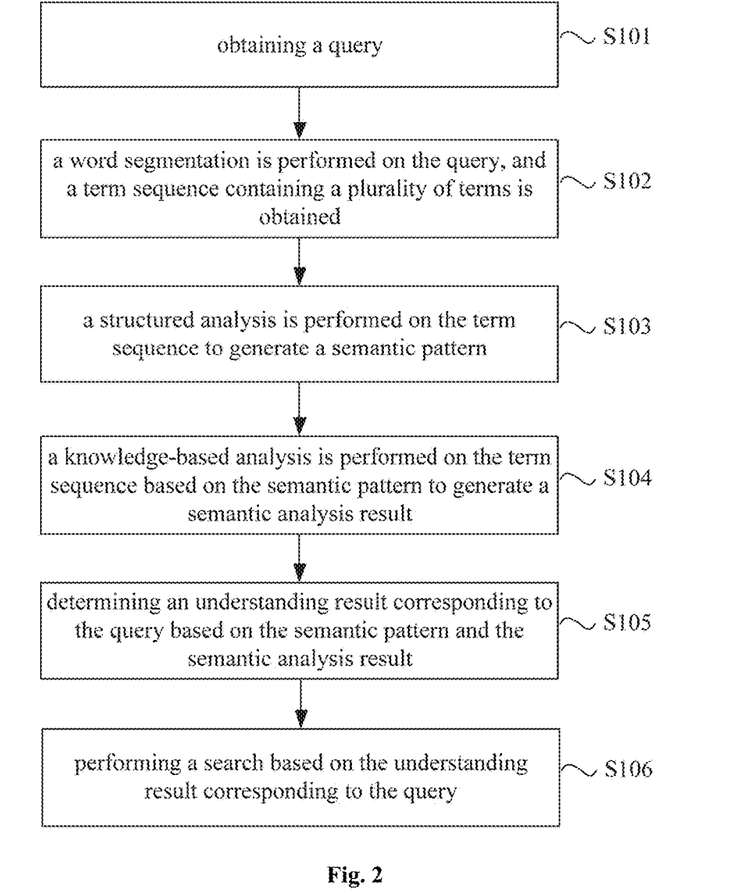
FIG. 2 is a flow chart of a search method based on artificial intelligence according to another embodiment of the present disclosure.

FIG. 2 is a flow chart of a search method based on artificial intelligence according to another embodiment of the present disclosure.

As illustrated in FIG. 2, the search method based on artificial intelligence includes the following.

At block S101, a query is obtained.

At block S102, a word segmentation is performed on the query, and a term sequence containing a plurality of terms is obtained.

At block S103, a structured analysis is performed on the term sequence to generate a semantic pattern.

At block S104, a knowledge-based analysis is performed on the term sequence based on the semantic pattern to generate a semantic analysis result.

At block S105, an understanding result corresponding to the query is determined based on the semantic pattern and the semantic analysis result.

It should be noted that, descriptions of blocks S101-S105 in FIG. 2 may refer to descriptions of blocks S101-S105 in FIG. 1, which is not elaborated herein.

The understanding result corresponding to the query may include information about demand, concept and intention of the user reflected by the query.

At block S106, a search is performed based on the understanding result corresponding to the query.

In the following, descriptions are made with reference to a detail embodiment.

Figure 6:
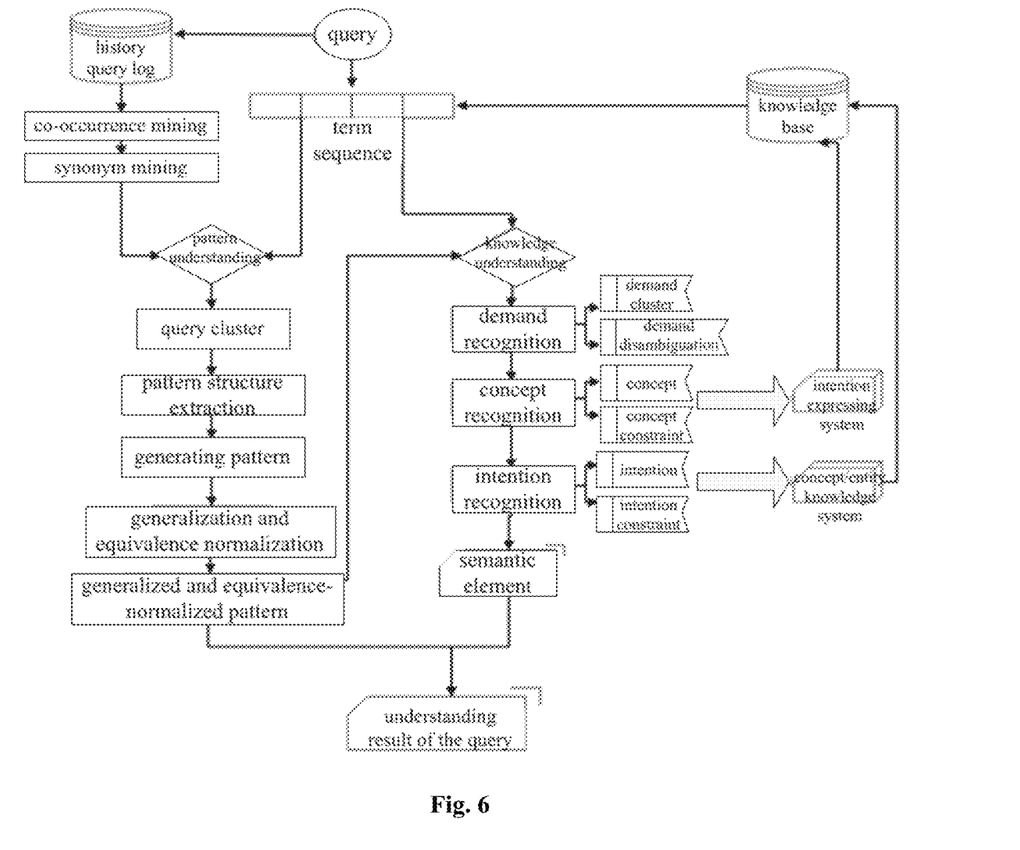
FIG. 6 is a schematic diagram showing a process of understanding a query according to a specific embodiment of the present disclosure.

In this embodiment, a process of the query understanding is divided into two parts: structured analysis (pattern understanding) of semantic and knowledge-based analysis (knowledge understanding) of semantic. The structured analysis is to analyze and obtain the semantic structure. Different from a grammar structure of subject-predicate-object commonly found in the natural language, the semantic structure in this embodiment is a structure about semantic. That is, the query is parsed into a pattern expression, i.e., the semantic structure (or semantic pattern). Each pattern represents one type of query. Each pattern represents a pattern abstraction result of a most common text structure of a certain type of query. The knowledge-based analysis is to perform semantic analysis on each populated variable (i.e. semantic element) in the pattern. The knowledge-based analysis on the semantic elements is a progressive hierarchy system, including the demand recognition, the concept recognition, the intention recognition, constraint on demand, constraint on concept, and constraint on intention. As illustrated in FIG. 6, after one query is obtained, the word segmentation is firstly performed on the query, and a term sequence is obtained. At the same time, the co-occurrence mining and the synonym mining is performed based on the history query log, and the plurality of extended queries is mined. Then the pattern understanding process is entered using the plurality of extended queries in combination with the term sequence. The cluster is performed on the mined result (the plurality of extended queries) based on a certain clustering algorithm. Then the pattern is obtained by performing the pattern structure extraction. Then the generalization and the equivalence normalization are performed on the pattern. After that, the knowledge-based analysis is performed based on the generalized and equivalence-normalized pattern and the term sequence, and then the semantic element is output. In detail, the demand recognition, the concept recognition, and the intention recognition are performed successively based on a knowledge base. The constraint on demand, the constraint on concept, and the constraint on intention are corresponding constraints. After the concept and the intention are recognized, the concept may be added into a concept/entity knowledge system, the intention is added into an intention expressing system. The knowledge base is updated by storing the concept/entity knowledge system and the intention expressing system. Finally, the pattern in combination with the semantic element is input to an understanding result of the query.

Figure 7:
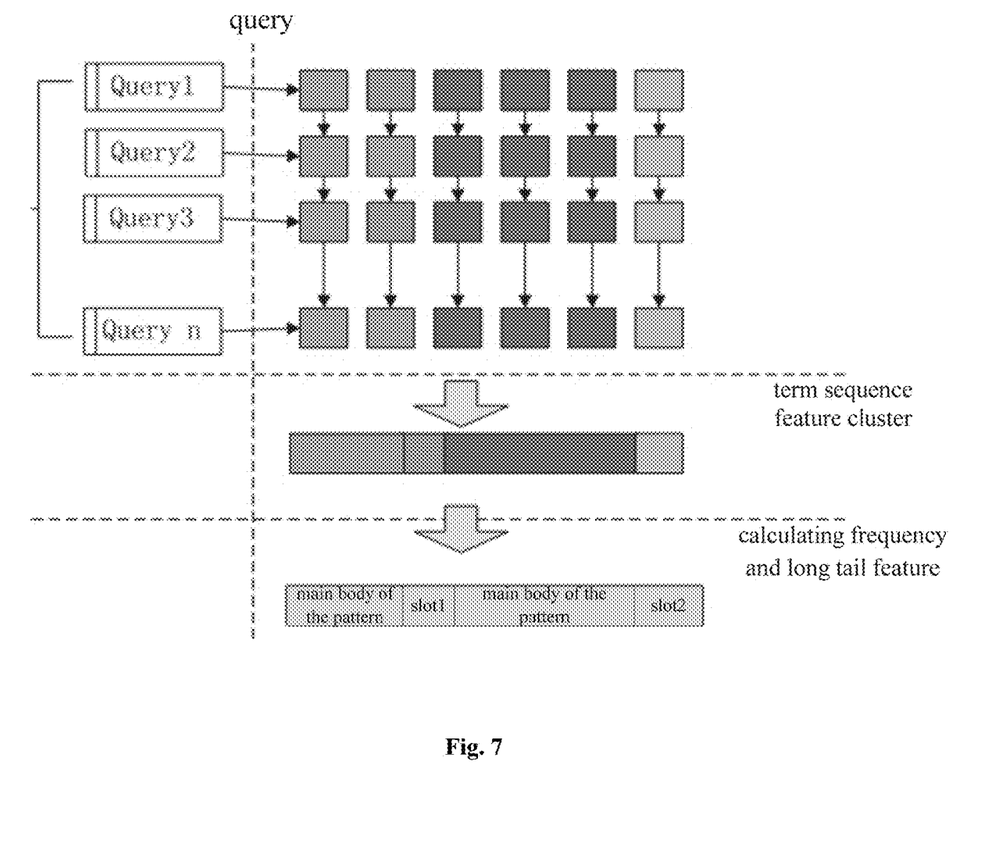
FIG. 7 is a schematic diagram showing obtaining a semantic pattern according to a specific embodiment of the present disclosure.

As illustrated in FIG. 7, during a process of pattern understanding, the pattern analysis of semantic structure of the query, based on a query set with a certain size, is a process of extracting common character of the queries in the query set and excluding specificity of the queries rather than a process analyzing a single query in a single aspect. In detail, by performing basic word segmentation (or advanced word segmentation based on existed knowledge base) on the queries represented as query 1 to query N, text is converted to a plurality of discrete term sequences. By calculating position overlap and dislocation relationship among the plurality of term sequences whose semantics are basically equivalent, the frequency of overlap and the long tail feature of dislocation are obtained, and the common term sequence (i.e., main body of the pattern) of the plurality of term sequences is determined. Finally, the differential term sequence is replaced with a slot with a certain type to obtain the semantic pattern.

The patterns obtained based on the clustering algorithm are mainly for queries having strong common character, which may cause that a large number of relatively discrete queries with less strong common character are ignored by the algorithm, resulting in a problem of insufficient coverage of the semantic pattern. Performing generalization may make up this part of lost coverage, and normalization of the synonym and equivalence relationship is performed on the patterns. In detail, algorithm and strategy are as follows.

1) Both pattern A and pattern B are filled with a plurality of groups of typical slot values (i.e., semantic element) to generate two queries respectively.

2) Two group of search results corresponding to the two queries respectively are obtained by the search engine.

3) Co-occurrence click between pattern A and pattern B is obtained. The co-occurrence click is a number of search results that a user validly and satisfactorily clicks in both the two group of search results. In addition to the co-occurrence click, other relevant indexes may also be obtained, which is not limited to in this embodiment.

4) Above steps 1)-3) are repeated for pattern A and other patterns, to obtain co-occurrence click between pattern A and other patterns.

5) A threshold score representing that pattern A and another pattern are approximately equivalent is obtained based on a distribution of obtained multiple groups of co-occurrence click. If co-occurrence click between pattern A and pattern C is greater than the threshold score, it is determined that pattern C is an equivalent pattern of pattern A.

According to embodiments of the present disclosure, by extending query understanding to semantic and knowledge (demand/concept/intention), accuracy of query recognition is improved based on the knowledge base for each aspect respectively, false recalls of search result are reduced, and relevance between the query and the first search result is improved. At the same time, both the pattern understanding and the knowledge-based understanding of the query have generalization ability and abstraction ability, thereby the understanding is not limited to a single vertical field in breadth, and is not limited to textual features in depth, thus having well generality and mobility, and improving recalling ability and recalling accuracy.

In addition, the knowledge-based analysis may include the demand recognition. The demand recognition may be divided into two parts: demand clustering and demand disambiguation. The demand clustering focuses on obtaining a vertical field that the query belongs to, such as an entertainment character, film and television work, physics common sense, poetry, ancient style prose, etc. The vertical field reflects a most rough cluster corresponding to the query that the user used for searching. When demand corresponding to the query input by a user points to a specific entity or a concept of one field, in a situation that there is no other constraint, and when the entity or the concept has multiple optional collections of a same name, by the demand disambiguation, which specific entity the user's potential demand points to is determined through the demand disambiguation. In a practical application scene, for example, a query is "broadcasting time of Tianlongbabu", it may be first identified whether the demand is a television and film category or a novel category. If the demand is the television and film category, and if there are multiple versions of Tianlongbabu, the demand points to which one of them.

Figure 8:
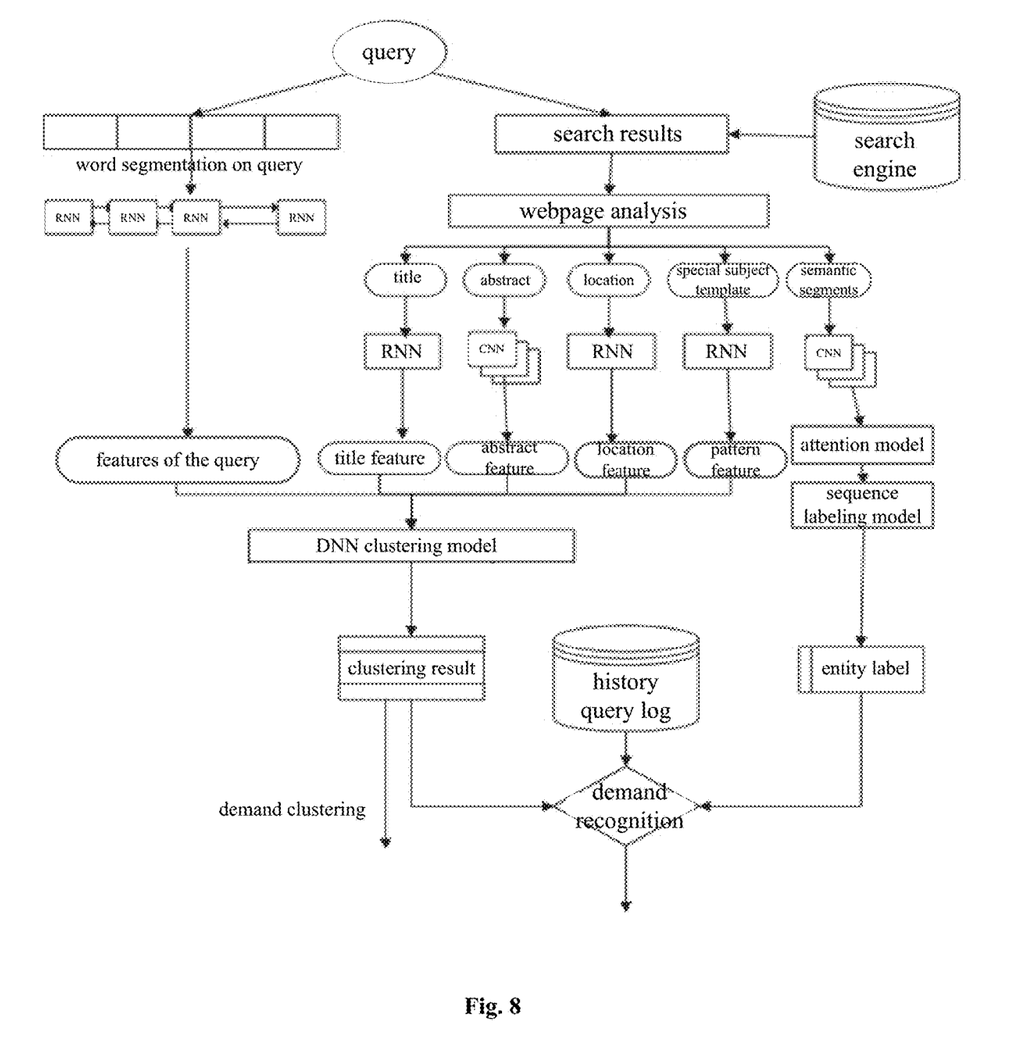
FIG. 8 is a schematic diagram showing a process of demand recognition according to a specific embodiment of the present disclosure.

As illustrated in FIG. 8, in a process of the demand recognition, features of the query may be obtained by using a recurrent neural network (RNN) model. In another aspect, by using the search engine, first N search results are recalled. Webpage analysis is performed on the above recalled search results, and a title feature, an abstract feature, a location feature, and a pattern feature are obtained by using the RNN model and/or a convolutional neural network (CNN) model. The above features in combination with the features of the query are input to a deep neural network (DNN) model to obtain a demand cluster of the query. In addition, by performing the webpage analysis, semantic segments may be obtained. A corresponding entity label may be obtained based on the obtained semantic segments by using the CNN model, an attention model and a sequence labeling model. Then the demand recognition is performed on the obtained demand cluster based on the knowledge base by using the entity label.

With the search method based on artificial intelligence according to embodiments of the present disclosure, by obtaining the query, performing the word segmentation on the query to obtain the term sequence containing the plurality of terms, and performing the structured analysis on the term sequence to generate the semantic pattern, then by performing the knowledge-based analysis on the term sequence based on the semantic pattern to generate the semantic analysis result, and finally determining the understanding result corresponding to the query based on the semantic pattern and the semantic analysis result, false recalls of search result are reduced, the accuracy is improved, and the user's demand is satisfied.

Figure 9:
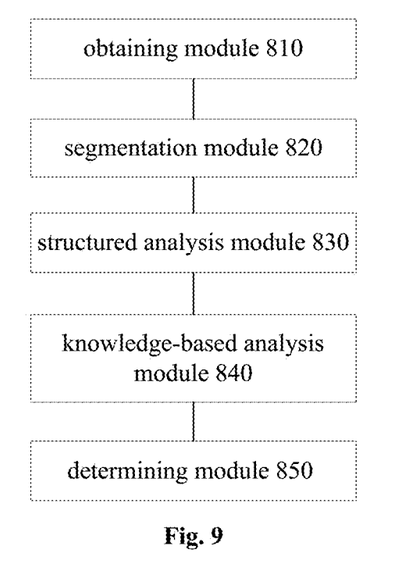
FIG. 9 is a block diagram showing a search device based on artificial intelligence according to an embodiment of the present disclosure.

To realize above embodiments, embodiments of the present disclosure further provide a search device based on artificial intelligence. FIG. 9 is a block diagram showing a search device based on artificial intelligence according to an embodiment of the present disclosure. As illustrated in FIG. 9, the device includes an obtaining module 810, a segmentation module 820, a structured analysis module 830, a knowledge-based analysis module 840, and a determining module 850.

The obtaining module 810 is configured to obtain a query.

The segmentation module 820 is configured to perform a word segmentation on the query to obtain a term sequence containing a plurality of terms.

The structured analysis module 830 is configured to perform a structured analysis on the term sequence to generate a semantic pattern.

The knowledge-based analysis module 840 is configured to perform a knowledge-based analysis on the term sequence based on the semantic pattern to generate a semantic analysis result. The determining module 850 is configured to determine an understanding result corresponding to the query based on the semantic pattern and the semantic analysis result.

Figure 10:
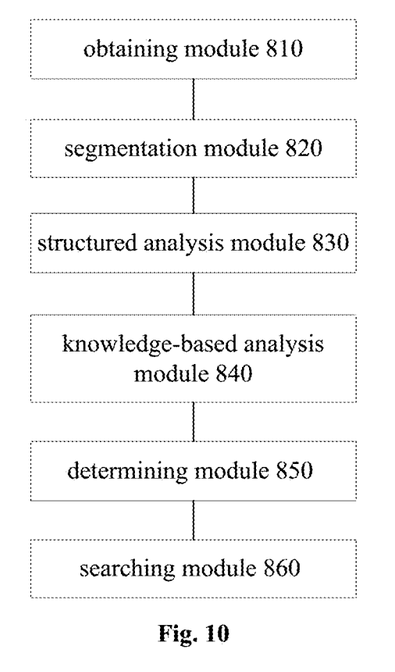
FIG. 10 is a block diagram showing a search device based on artificial intelligence according to an embodiment of the present disclosure.

FIG. 10 is a block diagram showing a search device based on artificial intelligence according to an embodiment of the present disclosure.

As illustrated in FIG. 10, based on the device according to the embodiment illustrated in FIG. 9, the device may further include a searching module 860. The searching module 860 is configured to perform a search based on the understanding result corresponding to the query.

It should be noted that, above mentioned description and explanation for the search method based on artificial intelligence are applicable to the search device based on artificial intelligence according to embodiments of the present disclosure. Details not described in this embodiment are not elaborated herein.

With the search device based on artificial intelligence according to embodiments of the present disclosure, by obtaining the query, performing the word segmentation on the query to obtain the term sequence containing the plurality of terms, and performing the structured analysis on the term sequence to generate the semantic pattern, then by performing the knowledge-based analysis on the term sequence based on the semantic pattern to generate the semantic analysis result, and finally determining the understanding result corresponding to the query based on the semantic pattern and the semantic analysis result, false recalls of search result are reduced, the accuracy is improved, and the user's demand is satisfied.

To realize above embodiments, embodiments of the present disclosure further provide a non-transitory computer-readable storage medium, having computer programs stored thereon. When the computer programs are executed by a processor, the processor is caused to execute a search method based on artificial intelligence according to above embodiments of the present disclosure.

To realize above embodiments, embodiments of the present disclosure further provide an electronic device. The electronic device includes a processor, a memory, and computer programs stored and executable on the memory. The processor is configured to perform a search method based on artificial intelligence according to above embodiments of the present disclosure.

For example, the When the computer programs are executed by a processor, the processor is caused to execute a search method based on artificial intelligence for realizing follows.

S101', a query is obtained.

S102', a word segmentation is performed on the query, and a term sequence containing a plurality of terms is obtained.

S103', a structured analysis is performed on the term sequence to generate a semantic pattern.

S104', a knowledge-based analysis is performed on the term sequence based on the semantic pattern to generate a semantic analysis result.

S105', an understanding result corresponding to the query is determined based on the semantic pattern and the semantic analysis result.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, without contradicting each other, various embodiments or examples described in the specification, as well as features of various embodiments or examples, may be combined.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, such as two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the functions may not be performed in the order shown or described, for example, in a substantially simultaneous manner or in a reverse order, depending on the functions involved, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A search method based on artificial intelligence, comprising:
   obtaining a query;
   performing a word segmentation on the query to obtain a term sequence containing a plurality of terms;
   performing a structured analysis on the term sequence to generate a semantic pattern;
   performing a knowledge-based analysis on the term sequence based on the semantic pattern to generate a semantic analysis result;
   determining an understanding result corresponding to the query based on the semantic pattern and the semantic analysis result; and performing a search based on the understanding result corresponding to the query;

wherein performing the structured analysis on the term sequence to generate the semantic pattern comprises:

performing a co-occurrence mining and a synonym mining on the term sequence based on a history query log to obtain a plurality of extended queries;

performing a cluster on the plurality of extended queries based on a preset clustering algorithm; and performing a structure extraction on the plurality of clustered extended queries to generate the semantic pattern;

wherein performing the structure extraction on the plurality of clustered extended queries to generate the semantic pattern comprises:

obtaining a frequency of overlap among the plurality of clustered extended queries and long tail feature of dislocation among the plurality of clustered extended queries by calculating position overlap and dislocation relationship among the plurality of clustered extended queries;

obtaining a common term sequence and a differential term sequence among the plurality of clustered extended queries based on the frequency of overlap among the plurality of clustered extended queries and the long tail feature of dislocation among the plurality of clustered extended queries;

replacing the differential term sequence among the plurality of clustered extended queries based on a slot of a preset type; and generating the semantic pattern based on the common term sequence and the slot of the preset type.

2. The method according to claim 1, further comprising: performing a generalization and an equivalence normalization on the semantic pattern.

3. The method according to claim 1, wherein performing the knowledge-based analysis on the term sequence based on the semantic pattern to generate the semantic analysis result comprises:

performing a demand recognition on the term sequence to generate a demand recognition result;

performing a concept recognition on the demand recognition result based on a knowledge base to generate a concept recognition result; and performing an intention recognition on the concept recognition result based on the knowledge base to generate the semantic analysis result.

4. The method according to claim 2, wherein performing the generalization and the equivalence normalization on the semantic pattern comprises:

filling a plurality of semantic element sets in both the semantic pattern and a candidate semantic pattern to generate a first query corresponding to the semantic pattern and a second query corresponding to the candidate semantic pattern;

performing a search based on the first query to obtain a first search result;

performing a search based on the second query to obtain a second search result;

calculating a co-occurrence score of click in the first search result and the second result; and in response to the co-occurrence score being greater than a preset score, determining that the candidate semantic pattern is equivalent to the semantic pattern.

5. The method according to claim 3, wherein performing the demand recognition on the term sequence to generate the demand recognition result comprises:

extracting a query feature corresponding to the term sequence;

obtaining a search result feature corresponding to the query; and generating the demand recognition result based on the query feature and the search result feature.

6. The method according to claim 5, wherein the search result feature comprises at least one of a title feature, an abstract feature, a location feature, and a pattern feature.

7. The method according to claim 5, after generating the demand recognition result based on the query feature and the search result feature, further comprising:

performing a demand disambiguation on the demand recognition result.

8. The method according to claim 7, wherein performing the demand disambiguation on the demand recognition result comprises:

obtaining a semantic segment of a search result corresponding to the query;

obtaining an entity label in the semantic segment using a preset model; and performing the demand disambiguation on the demand recognition result based on the entity label.

9. A search device based on artificial intelligence, comprising:

one or more processors; and a memory having computer programs stored thereon that, when executed by the one or more processors, implement a search method based on artificial intelligence, the method comprising:

obtaining a query;

performing a word segmentation on the query to obtain a term sequence containing a plurality of terms;

performing a structured analysis on the term sequence to generate a semantic pattern;

performing a knowledge-based analysis on the term sequence based on the semantic pattern to generate a semantic analysis result;

determining an understanding result corresponding to the query based on the semantic pattern and the semantic analysis result; and performing a search based on the understanding result corresponding to the query;

wherein performing the structured analysis on the term sequence to generate the semantic pattern comprises:

performing a co-occurrence mining and a synonym mining on the term sequence based on a history query log to obtain a plurality of extended queries;

performing a cluster on the plurality of extended queries based on a preset clustering algorithm; and performing a structure extraction on the plurality of clustered extended queries to generate the semantic pattern;

wherein performing the structure extraction on the plurality of clustered extended queries to generate the semantic pattern comprises:

obtaining a frequency of overlap among the plurality of clustered extended queries and long tail feature of dislocation among the plurality of clustered extended queries by calculating position overlap and dislocation relationship among the plurality of clustered extended queries;

obtaining a common term sequence and a differential term sequence among the plurality of clustered extended queries based on the frequency of overlap among the plurality of clustered extended queries and the long tail feature of dislocation among the plurality of clustered extended queries;

replacing the differential term sequence among the plurality of clustered extended queries based on a slot of a preset type; and generating the semantic pattern based on the common term sequence and the slot of the preset type.

10. The device according to claim 9, wherein the method further comprises:

performing a generalization and an equivalence normalization on the semantic pattern.

11. The device according to claim 9, wherein performing the knowledge-based analysis on the term sequence based on the semantic pattern to generate the semantic analysis result comprises:

performing a demand recognition on the term sequence to generate a demand recognition result;

performing a concept recognition on the demand recognition result based on a knowledge base to generate a concept recognition result; and performing an intention recognition on the concept recognition result based on the knowledge base to generate the semantic analysis result.

12. The device according to claim 10, wherein performing the generalization and the equivalence normalization on the semantic pattern comprises:

filling a plurality of semantic element sets in both the semantic pattern and a candidate semantic pattern to generate a first query corresponding to the semantic pattern and a second query corresponding to the candidate semantic pattern;

performing a search based on the first query to obtain a first search result;

performing a search based on the second query to obtain a second search result;

calculating a co-occurrence score of click in the first search result and the second result; and in response to the co-occurrence score being greater than a preset score, determining that the candidate semantic pattern is equivalent to the semantic pattern.

13. The device according to claim 11, wherein performing the demand recognition on the term sequence to generate the demand recognition result comprises:

extracting a query feature corresponding to the term sequence;

obtaining a search result feature corresponding to the query; and generating the demand recognition result based on the query feature and the search result feature.

14. The device according to claim 13, wherein the search result feature comprises at least one of a title feature, an abstract feature, a location feature, and a pattern feature.

15. The device according to claim 13, after generating the demand recognition result based on the query feature and the search result feature, the method further comprises:

performing a demand disambiguation on the demand recognition result.

16. A non-transitory computer-readable storage medium comprising instructions, when the instructions are executed by a processor of a device to perform acts of:

obtaining a query;

performing a word segmentation on the query to obtain a term sequence containing a plurality of terms;

performing a structured analysis on the term sequence to generate a semantic pattern;

performing a knowledge-based analysis on the term sequence based on the semantic pattern to generate a semantic analysis result;

determining an understanding result corresponding to the query based on the semantic pattern and the semantic analysis result; and performing a search based on the understanding result corresponding to the query;

wherein performing the structured analysis on the term sequence to generate the semantic pattern comprises:

performing a co-occurrence mining and a synonym mining on the term sequence based on a history query log to obtain a plurality of extended queries;

performing a cluster on the plurality of extended queries based on a preset clustering algorithm; and performing a structure extraction on the plurality of clustered extended queries to generate the semantic pattern;

wherein performing the structure extraction on the plurality of clustered extended queries to generate the semantic pattern comprises:

obtaining a frequency of overlap among the plurality of clustered extended queries and long tail feature of dislocation among the plurality of clustered extended queries by calculating position overlap and dislocation relationship among the plurality of clustered extended queries;

obtaining a common term sequence and a differential term sequence among the plurality of clustered extended queries based on the frequency of overlap among the plurality of clustered extended queries and the long tail feature of dislocation among the plurality of clustered extended queries;

replacing the differential term sequence among the plurality of clustered extended queries based on a slot of a preset type; and generating the semantic pattern based on the common term sequence and the slot of the preset type.

* * * * *